United States Patent [19]

Hirasawa

[11] Patent Number: 5,315,340
[45] Date of Patent: May 24, 1994

[54] VIDEO CAMERA APPARATUS

[75] Inventor: Masahide Hirasawa, Sagamihara, Japan

[73] Assignee: Canon Kabushiki Kaisha, Tokyo, Japan

[21] Appl. No.: 927,855

[22] Filed: Aug. 10, 1992

[30] Foreign Application Priority Data

Aug. 14, 1991 [JP] Japan .................. 3-228803

[51] Int. Cl.$^5$ ............................................. G03B 13/36
[52] U.S. Cl. ...................................... 354/400; 354/402; 354/195.1
[58] Field of Search .................. 354/400, 402, 195.1

[56] References Cited

U.S. PATENT DOCUMENTS

| 4,609,274 | 9/1986 | Iwashita et al. | 354/400 |
| 4,777,505 | 10/1988 | Hata et al. | 354/195.1 |
| 4,845,521 | 7/1989 | Akashi | 354/400 |
| 4,933,701 | 6/1990 | Matsuyama | 354/400 |
| 4,985,723 | 1/1991 | Egawa et al. | 354/400 |
| 5,144,491 | 9/1992 | Ushiro et al. | 354/400 |
| 5,164,756 | 11/1992 | Hirasawa | 354/400 |

Primary Examiner—Russell E. Adams
Attorney, Agent, or Firm—Robin, Blecker, Daley & Driscoll

[57] ABSTRACT

A lens control apparatus, which includes a lens drive section for driving a focus adjustment lens group, a lens drive controller for supplying a drive signal to the lens drive section, an automatic focus adjustment circuit for controlling the lens drive controller in an automatic focus adjustment mode, and a manual focus adjustment circuit for controlling the lens drive controller in a manual focus adjustment mode on the basis of a manual focus operation, has a selection circuit for, when a manual focus operation is performed, selecting the manual focus adjustment circuit to execute the drive control of the lens group.

16 Claims, 7 Drawing Sheets

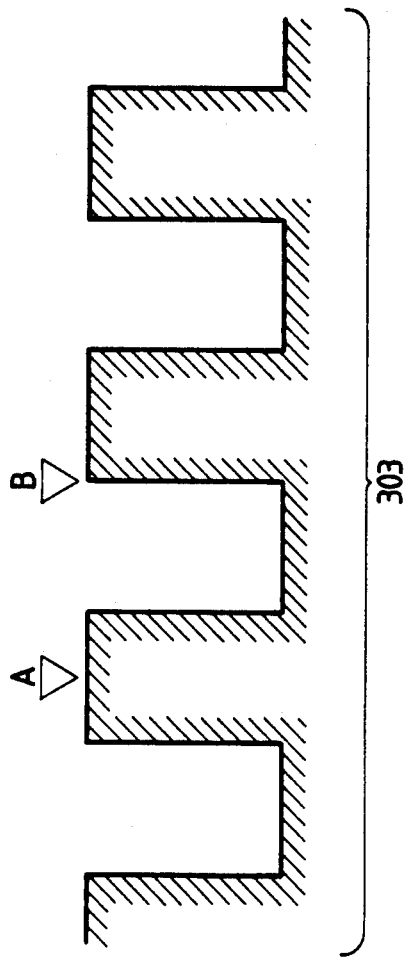
FIG. 7
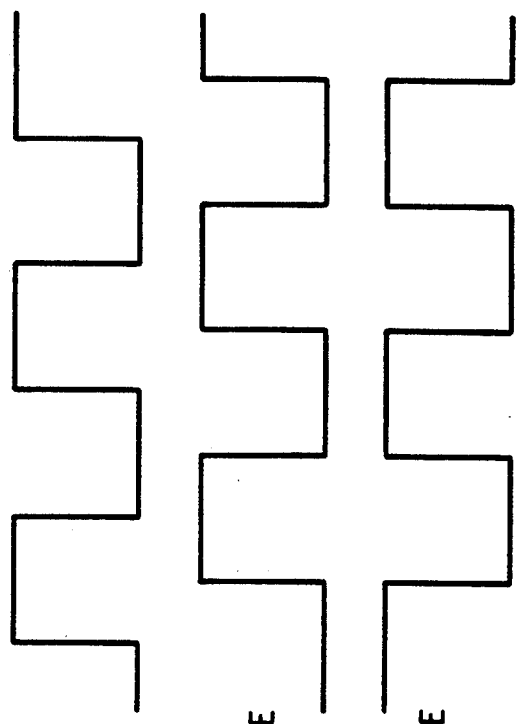
FIG. 8A
FIG. 8B

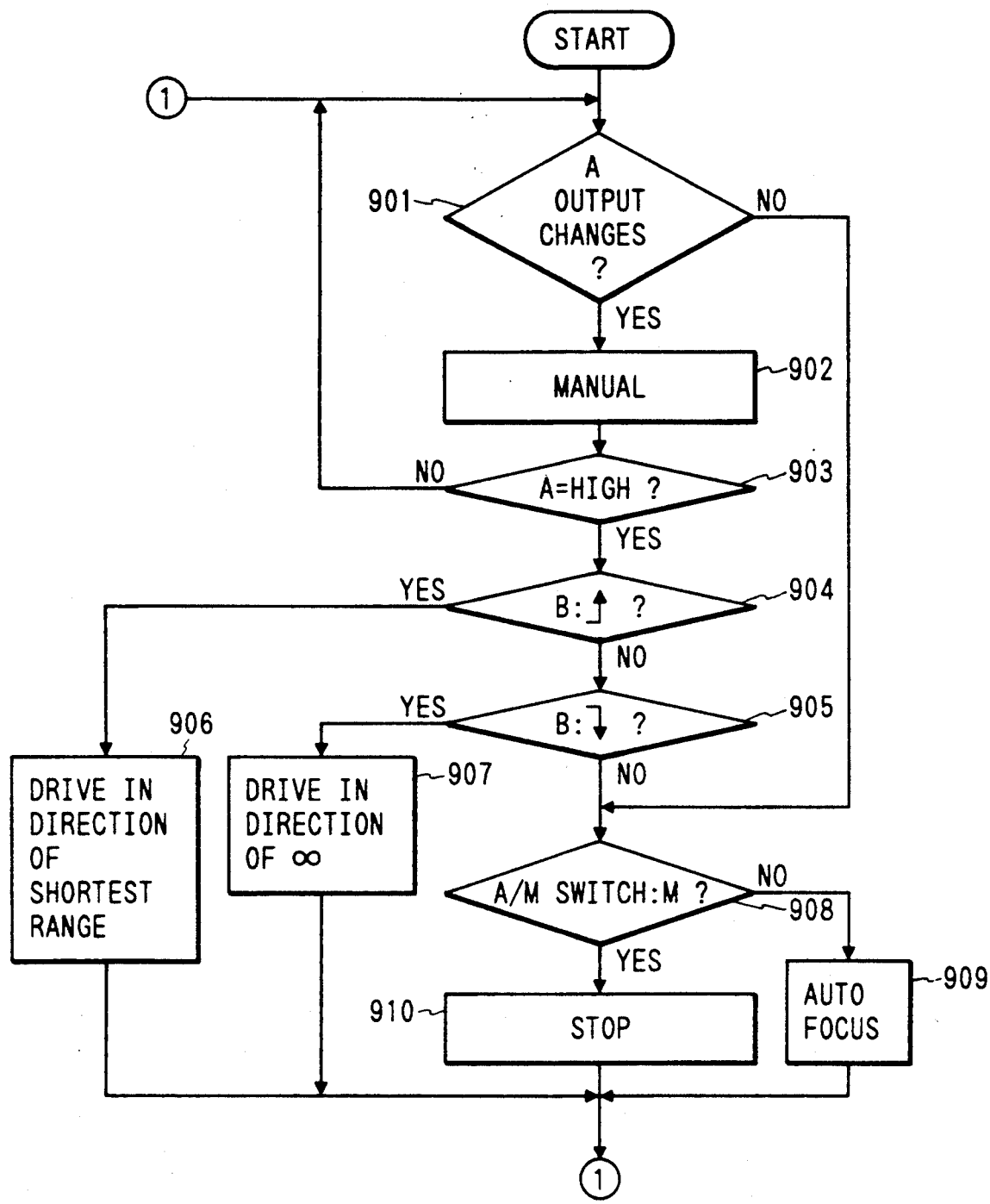

VIDEO CAMERA APPARATUS

BACKGROUND OF THE INVENTION

1. Field of the Invention

The present invention relates to a lens control apparatus used in, e.g., a video camera and having both an automatic focus adjustment function and a manual focus adjustment function and, more particularly, to a lens control apparatus, which can automatically switch to the manual focus adjustment mode even in a photographing operation in the automatic focus adjustment mode.

2. Related Background Art

FIG. 1 is a view showing a lens system of a conventional inner focus type lens control apparatus.

In this lens system, a stationary lens group 101, a zoom lens group 102 for performing a zooming (variable magnification) operation, an aperture 103, a stationary lens group 104, a focus compensation lens group 105 housed inside a lens barrel, and having both a focus adjustment function and a compensator function (a function of correcting movement of a focal plane upon zooming), and an image pickup element 106 are arranged along the optical axis from a direction of an object on the left side in FIG. 1. The image pickup element 106 has an image pickup surface 106a.

In a so-called front-element focus type lens system for performing focus adjustment using a movable lens group in place of the stationary lens group 101, when manual focus adjustment is to be performed, a helicoid or the like fitted on a lens barrel is rotated, and its drive force is mechanically supplied to a lens, thereby moving a focus adjustment lens along the optical axis. However, in the inner focus type lens system shown in FIG. 1, it is difficult to arrange such a mechanical and external drive means for the following reasons.

More specifically, since the lens group for focus adjustment is arranged inside the lens barrel, it is difficult to arrange a helicoid, a knob, and the like on the outer surface of the lens barrel. In addition, holes for the helicoid, knob, and the like must be formed on the outer surface o the product covering the entire lens barrel, and it is not preferable in terms of the outer appearance and cost.

Since the focus compensation lens group 105 has both the compensator function and the focus adjustment function, the in-focus position of the lens group 105 on the image pickup surface 106a varies depending on the object distance and the focal length even if the focal length remains the same. When the object distance is changed at each focal length, the in-focus position of the lens group 105 on the image pickup surface 106a is continuously plotted, as shown in FIG. 2. In a zooming operation, one of paths shown in FIG. 2 is selected according to the object distance, and the lens group 105 is moved along the selected path, thus attaining the zooming operation free from an out-of-focus state. In order to realize tracing of the path, as described above, the position of the zoom lens group 102 and the object distance are detected by certain methods to determine one of the plurality of paths shown in FIG. 2 on which the lens group 105 is present. For example, as shown in FIG. 3, each path according to the zoom lens position and the focus compensation lens position is divided into a plurality of blocks, and tables storing drive speeds capable of tracing the paths corresponding to the positions are formed in units of blocks. Thus, the focus compensation lens group 105 must be moved to the next position, i.e., block using the path tracing drive speed set for the selected block according to the zoom lens position and the focus compensation lens position. In general, the drive control of the lens group 105 is finely performed using a microcomputer and a stepping motor. When a stepping motor is used, the position of the lens group 105 is detected by counting the number of drive steps in place of using a position encoder in the lens group 105.

Therefore, when a drive command or a drive force is applied to the lens group 105 from another system different from the microcomputer, the microcomputer cannot detect the accurate position of the lens group 105, and may erroneously detect an abnormal drive state of the lens.

However, many photographers want to perform manual focus adjustment during a photographing operation. Furthermore, in consideration of the fact that the performance of the automatic focus adjustment (auto focus) function of currently commercially available apparatuses is not perfect depending on the photographing state, the manual focus adjustment (manual focus) function is also indispensable in the inner focus type lens system.

When a manual focus adjustment is performed in the inner focus type lens system, the following two operations are possible. ① For example, the manual focus adjustment mode is selected using an auto/manual focus selection switch for selecting the automatic or manual focus adjustment function, and then, a drive command switch in a direction of shortest range or in a direction of ∞ is depressed, thus performing a focusing operation through the microcomputer. ② A rotary ring having an encoder function capable of detecting the rotational direction and the rotational amount per unit time is fitted on the lens barrel, the rotational amount and direction of the ring are read by the microcomputer, and the focus compensation lens group 105 is driven according to the read result.

However, since the focus adjustment lens group can only be driven through the microcomputer, and the focusing operation is performed after the manual mode is selected, the conventional system has the following drawbacks.

① When the manual focus mode is to be selected during a photographing operation, a photographer must fumble for the auto/manual focus selection switch, resulting in camera-shake since he or she removes his or her eye from the finder, or in a long fumbling time.

② When an object which cannot be easily focused by the auto focus function cannot be focused in a photographing operation in the auto focus mode, it is not easy to select the manual operation while continuing the photographing operation for the reason ①.

③ Once the manual focus mode is selected, the auto focus mode cannot be automatically resumed unless a reset operation (e.g., a power-OFF operation) is performed. Therefore, a mode selection operation must be performed when a photographing operation using the auto focus mode is to be performed in a shot next to the photographing operation in the manual focus mode, resulting in troublesome operations.

④ When a photographer forgets that the manual focus mode is selected, an in-focus state can no longer be obtained if he or she directs the camera to an object having a different distance.

SUMMARY OF THE INVENTION

The present invention has been made to solve the above-mentioned problems, and has as its first object to provide a lens control apparatus, which can smoothly switch between an automatic focus adjustment mode and a manual focus adjustment mode.

It is the second object of the present invention to provide a lens control apparatus, which can automatically select a manual focus adjustment mode in an automatic focus adjustment mode, and can also easily resume the automatic focus adjustment mode.

It is the third object of the present invention to provide a lens control apparatus, which can perform a manual focus adjustment operation at a desired timing independently of a selected focus adjustment mode.

In order to achieve the above objects, according to a preferred aspect of the present invention, there is disclosed a lens control apparatus comprising lens drive means for driving a focus adjustment lens group, automatic focus adjustment means for controlling the lens drive means in an auto focus adjustment mode, manual focus adjustment means for controlling the lens drive means in a manual focus adjustment mode, and control means for, when a manual operation is performed, preferentially enabling the manual focus adjustment means to set the manual focus adjustment mode.

With this arrangement, even when a photographer wants to drive a focus adjustment lens group using a manual focus adjustment function independently of an automatic focus adjustment function, in a photographing operation in the automatic focus adjustment mode, he or she need only perform the same operation as that for driving the focus adjustment lens group in the manual focus adjustment mode, thus automatically selecting the manual focus adjustment function.

It is the fourth object of the present invention to provide a lens control apparatus, which can immediately resume a mode set by focus adjustment mode switching means after a manual focus adjustment operation is canceled.

In order to achieve the above object, according to another preferred aspect of the present invention, there is disclosed a lens control apparatus comprising lens drive means for driving a focus adjustment lens group, automatic focus adjustment means for controlling the lens drive means in an autofocus adjustment mode, manual focus adjustment means for controlling the lens drive means in a manual focus adjustment mode, switching means for selectively switching between the automatic focus adjustment means and the manual focus adjustment means, and control means for, when a manual focus operation is performed, enabling the manual focus adjustment means regardless of a state of the switching means, and enabling the focus adjustment means selected by the switching means upon completion of the manual focus operation.

With this arrangement, when a photographer stops an operation for driving a focus adjustment lens group, the automatic focus adjustment mode can be automatically resumed, and the conventional problem of the switching operation between the automatic and manual focus adjustment modes can be solved.

Other objects and features of the present invention will become apparent from the following specification and the accompanying drawings.

BRIEF DESCRIPTION OF THE DRAWINGS

FIG. 7 is an explanatory view for explaining an operation of the embodiment shown in FIG. 6;

FIGS. 8A and 8B are explanatory views for explaining the operation of the embodiment shown in FIG. 6; and FIG. 9 is a flow chart for explaining the operation of the embodiment shown in FIG. 6.

DETAILED DESCRIPTION OF THE PREFERRED EMBODIMENTS

Figure 1:
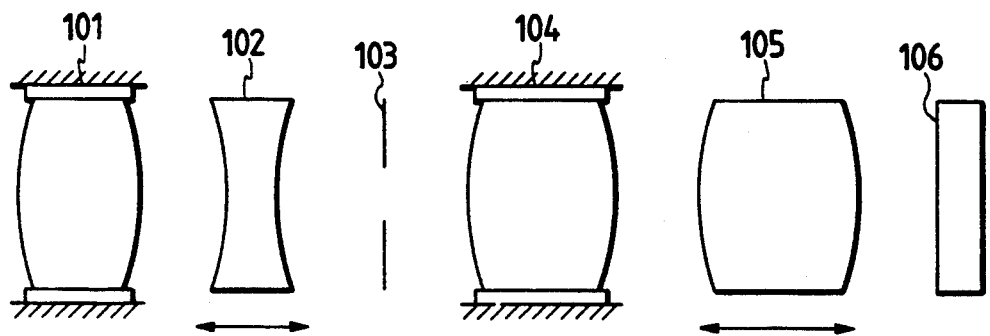
FIG. 1 is a schematic view showing an arrangement of an inner focus type lens system.
Figure 3:
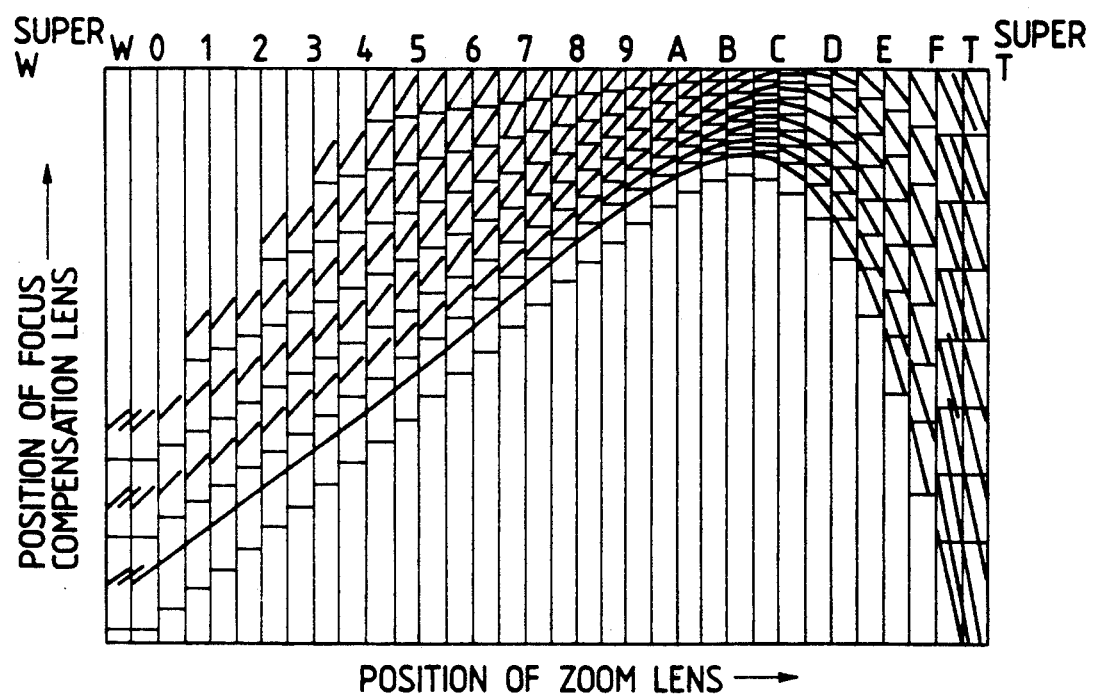
FIG. 3 is another graph showing the positional relationship between the zoom lens and the focus compensation lens.
Figure 2:
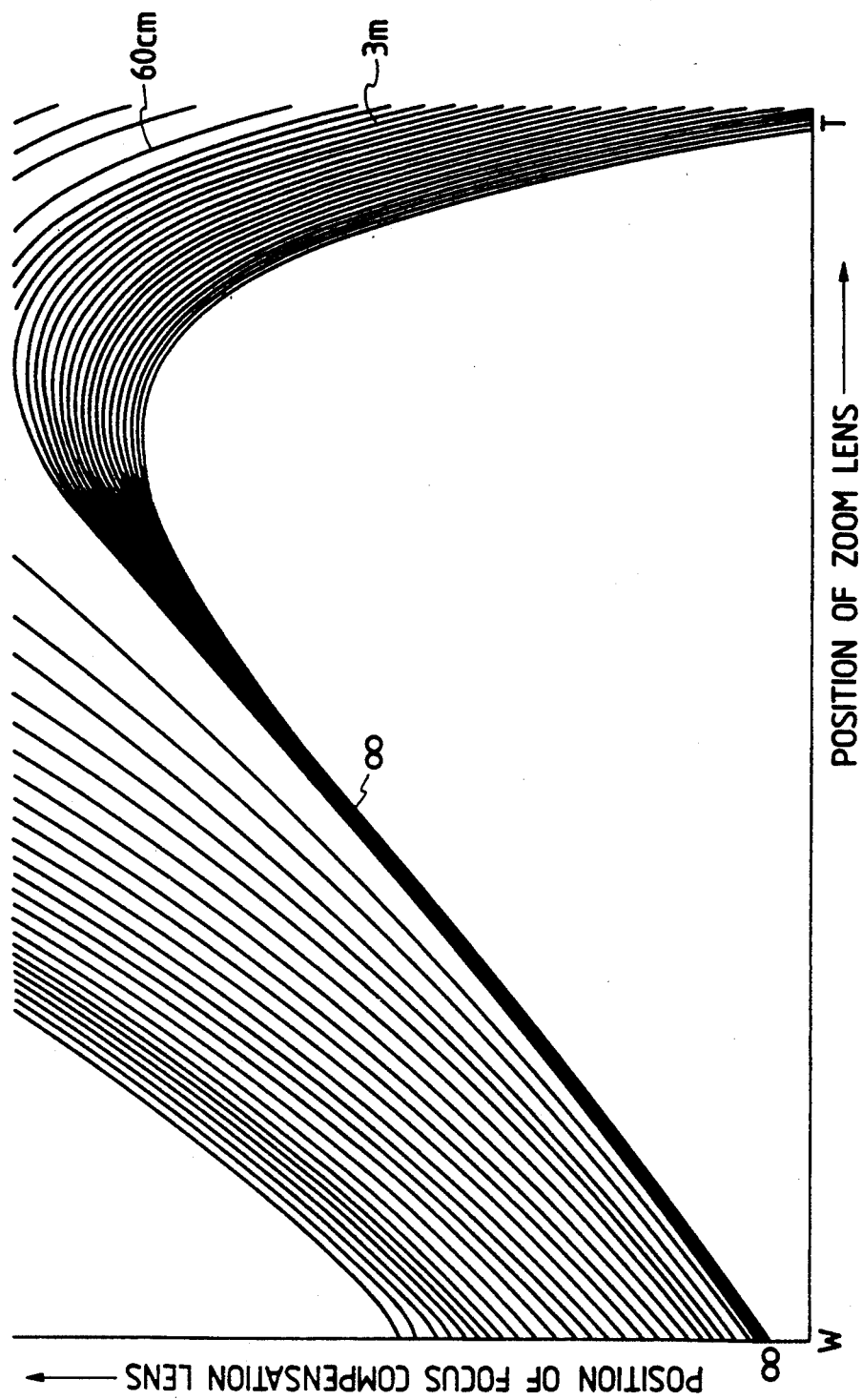
FIG. 2 is a graph showing the positional relationship between a zoom lens and a focus compensation lens.
Figure 4:
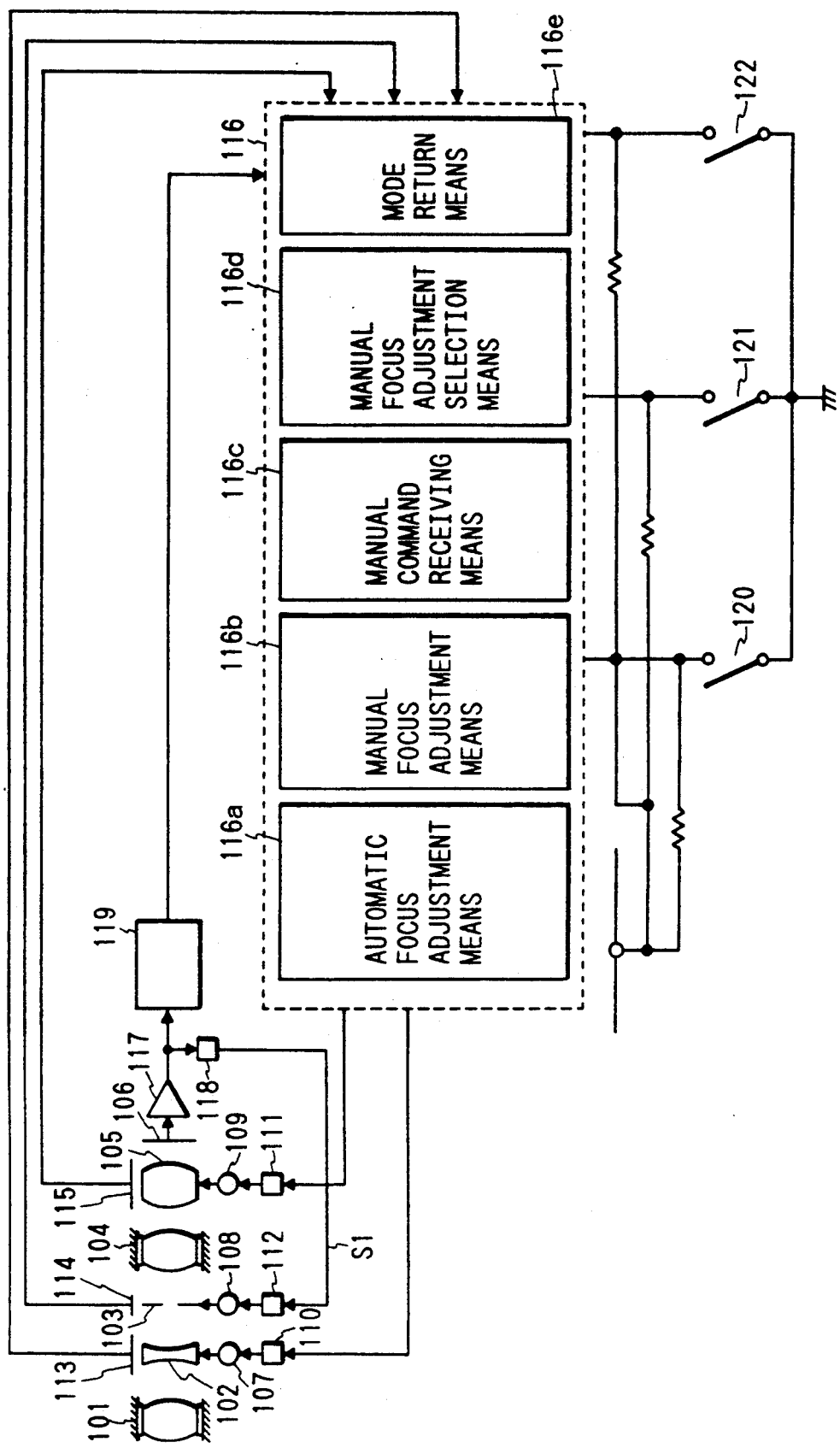
FIG. 4 is a schematic block diagram showing an arrangement of a lens control apparatus according to the first embodiment of the present invention.
Figure 5:
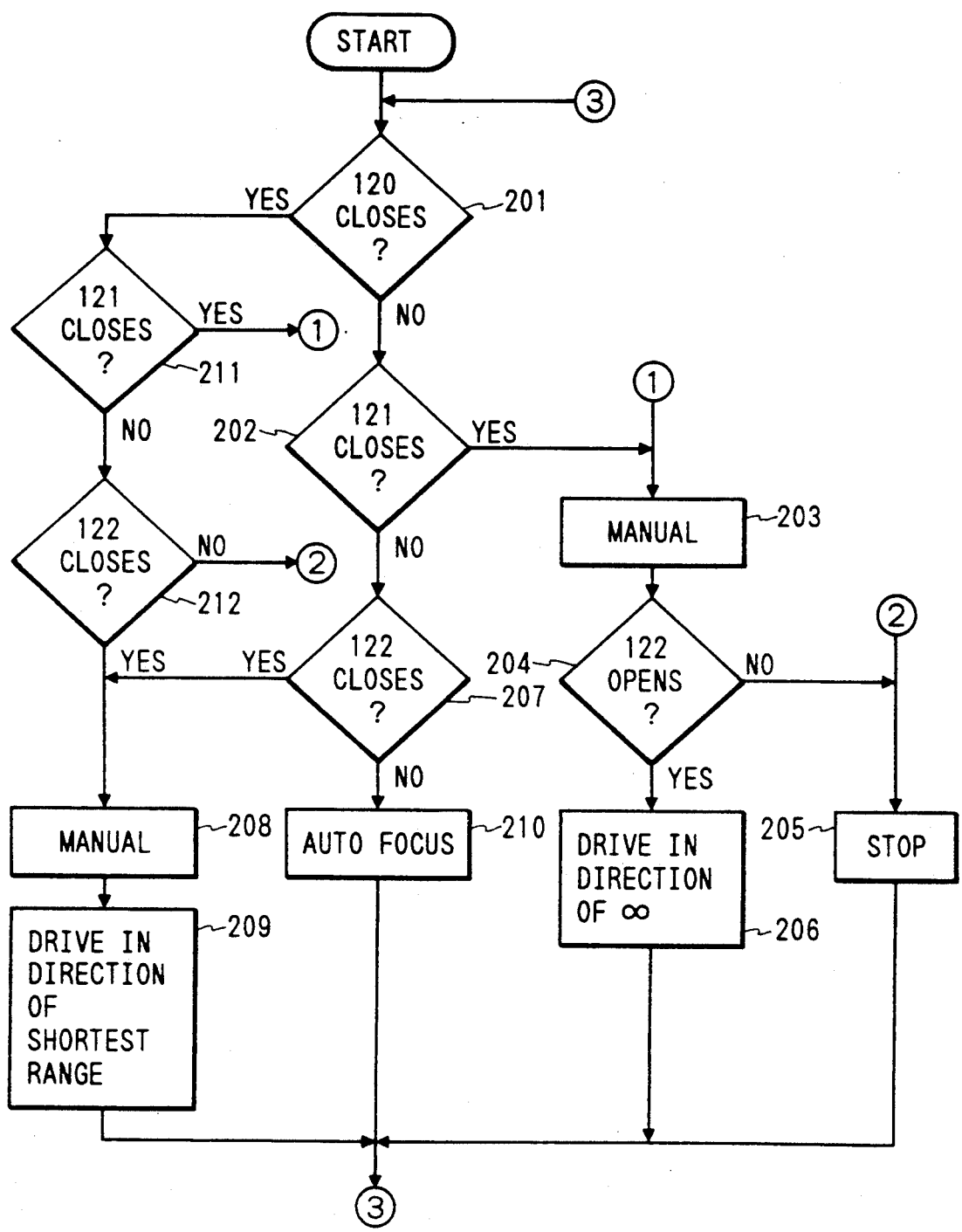
FIG. 5 is a flow chart for explaining an operation of the embodiment shown in FIG. 4.

An embodiment of the present invention will be described hereinafter with reference to the accompanying drawings. FIG. 4 is a schematic block diagram showing an arrangement of a lens control apparatus according to the first embodiment of the present invention, and FIG. 5 is a flow chart for explaining the operation of the lens control apparatus shown in FIG. 4. In these figures, the same reference numerals denote the same parts as in the prior art.

In FIG. 4, this lens control apparatus is of an inner focus type that attains a compact structure by adopting a stationary front lens group, and is constituted by a stationary lens group 101, a zoom lens group 102 for performing a zooming operation, an aperture 103, a stationary lens group 104, a focus compensation lens group 105 having both a focus adjustment function and a compensator function, and an image pickup surface 106a of an image pickup element 106 such as a CCD, which are arranged in turn along the optical axis from a direction of an object on the left side in FIG. 4.

The zoom lens group 102, the aperture 103, and the focus compensation lens group 105 are moved in the direction of the optical axis by actuators 107, 108, and 109, respectively. Of these actuators, the actuators 107 and 109 are driven by drivers 110 and 111 on the basis of a drive command from a microcomputer 116, and the actuator 108 is driven by a driver 112 on the basis of a feedback signal S1.

The states, i.e., the moving directions, positions, speeds, and the like of the zoom lens group 102, the aperture 103, and the focus compensation lens group 105 are respectively detected by encoders 113, 114, and 115, and detection signals are input to the microcomputer 116.

The microcomputer 116 has a function of controlling the operation of the overall apparatus, e.g., of controlling the position of the focus compensation lens group 105 with respect to the position of the zoom lens group 102. The microcomputer 116 comprises an automatic focus adjustment means 116a, a manual focus adjustment means 116b, a manual command receiving means 116c, a manual focus adjustment selection means 116d, and a mode return means 116e.

Furthermore, a video signal picked up by the image pickup element 106 is amplified by an amplifier 117, and the amplified signal is output to an aperture controller 118. The amplified signal is also input to the microcomputer 116 through a high-pass filter 119 for extracting a high-frequency component of the video signal so as to calculate an in-focus point. The aperture controller 118 has a function of detecting the level of the output signal from the amplifier 117, and opening/closing the aperture 103 so that the detected level is always equal to a predetermined reference value.

The microcomputer 116 is connected to a mode selection switch 120 for switching between the automatic focus adjustment mode and the manual focus adjustment mode, an ∞ direction drive switch 121 for manually driving the focus lens in the direction of ∞, and a shortest range direction drive switch 122 for manually driving the focus lens in the direction of shortest range.

The operation of the lens control apparatus with the above arrangement, especially, the operation of the microcomputer 116, will be described below with reference to the flow chart shown in FIG. 5.

When execution of the processing is started, it is detected in step 201 if the mode selection switch 120 for switching between the manual and automatic focus adjustment modes is closed. If NO in step 201, i.e., if the automatic focus adjustment mode is selected, it is detected in step 202 if the switch 121 is closed. If YES in step 202, the manual command receiving means 116c accepts an ∞ direction drive command as a manual focus command. In step 203, the manual focus adjustment selection means 116d selects the manual focus adjustment means 116b, and it is then checked in step 204 if the switch 122 is open. If NO in step 204, since it is determined that a command (manual focus command) of a drive direction is indefinite, the focus compensation lens group 105 is stopped in step 205. However, if YES in step 204, since only the switch 121 is depressed, the focus compensation lens group 105 is driven in the direction of ∞ in step 206.

If it is determined in step 202 that the switch 121 is open, it is checked in step 207 if the switch 122 is closed. If YES in step 207, since it has already been confirmed that the switch 121 is open, it can be determined that only the switch 122 is depressed. In step 208, the manual focus adjustment selection means 116d selects the manual focus adjustment means 116b, and drives the focus compensation lens group 105 in the direction of shortest range in step 209.

If it is determined in step 207 that the switch 122 is also open, the mode return means 116e determines that no manual focus command is issued by a photographer, sets the automatic focus adjustment mode (step 210), and entrusts the drive control of the focus compensation lens group 105 to the automatic focus adjustment means 116a.

The automatic focus adjustment means 116a extracts the high-frequency component of the output signal from, e.g., the amplifier 117 using the high-pass filter 119, and moves the focus compensation lens group 105 to maximize the high-frequency component. At this time, the moving speed of the focus compensation lens group 105 is switched according to the output signal from the encoder 114, i.e., an aperture value, thus always selecting a proper focus speed with respect to a change in depth of field.

If it is determined in step 201 that the switch 120 is closed, it is determined that a photographer intentionally selects the manual focus adjustment mode, and the flow advances to step 211. The focus compensation lens group 105 is driven in the direction of the depressed switch 121 or 122 by the same method as described above using the manual focus adjustment means 116b. More specifically, if it is determined in step 211 that the switch 121 is closed, the flow advances to step 203. If it is determined in step 211 that the switch 121 is open, the open/closing state of the switch 122 is checked in step 212. At this time, if it is determined that the switch 122 is closed, the flow advances to step 208; otherwise, the flow advances to step 205.

Since the above-mentioned processing (FIG. 5) is executed by the microcomputer 116, when the ∞/shortest range drive switch 121 or 122 is depressed even in the automatic focus adjustment mode, the manual focus adjustment mode can be automatically selected, and the focus compensation lens group 105 can be moved in a direction intended by a photographer. When the photographer releases the ∞/shortest range drive switch 121 or 122, if the automatic focus adjustment mode is originally set, the control can be automatically returned to the automatic focus adjustment mode. Therefore, the photographer can perform focusing by a desired method regardless of whether the manual focus adjustment mode or the automatic focus adjustment mode is currently selected.

The second embodiment of the present invention will be described below.

Figure 6:
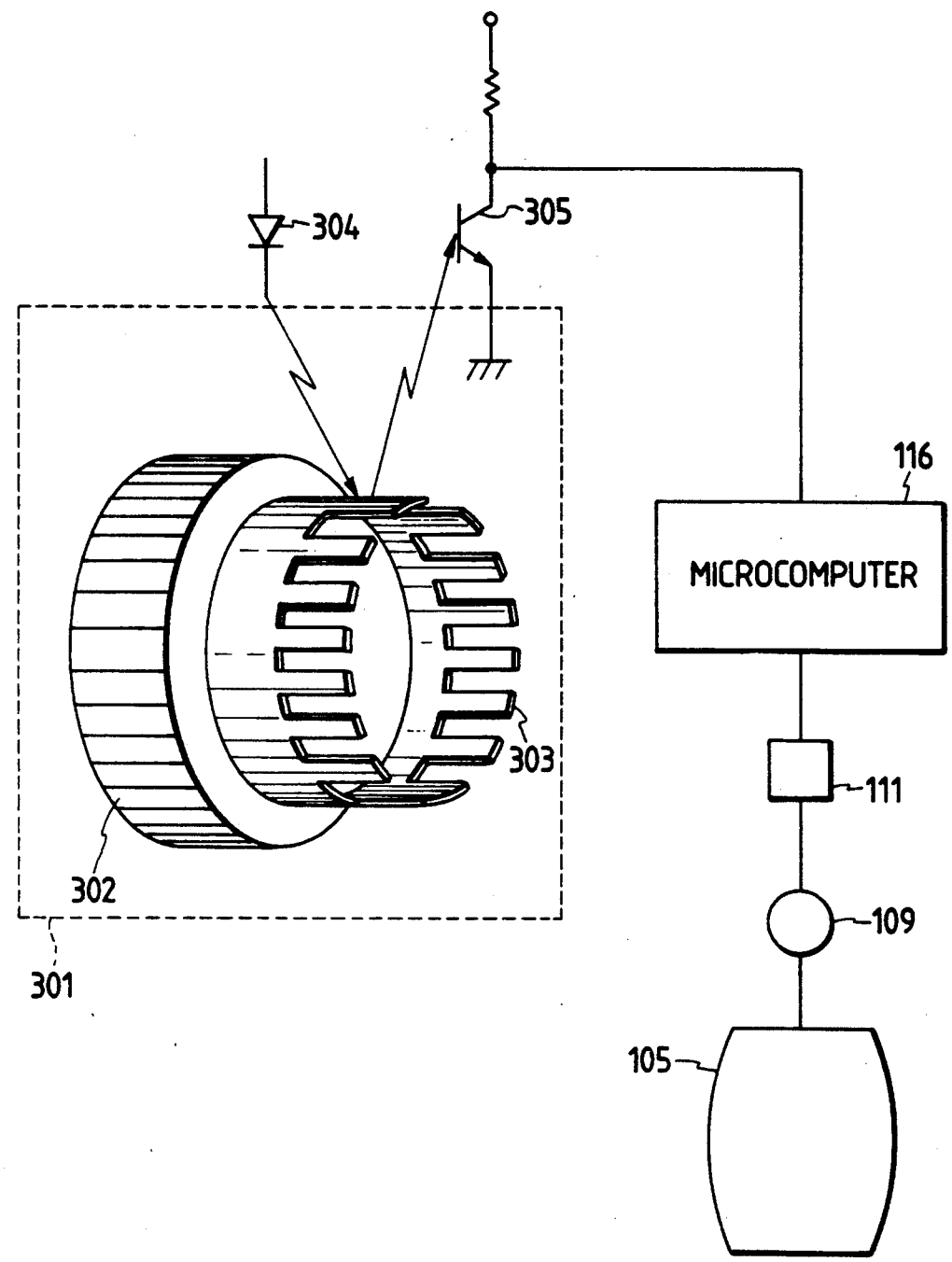
FIG. 6 is a schematic diagram showing a lens control apparatus according to the second embodiment of the present invention.

FIG. 6 is a schematic diagram showing an arrangement of a lens control apparatus according to the second embodiment of the present invention. The same reference numerals in FIG. 6 denote the same parts as in FIG. 4.

A difference between this lens control apparatus and the first embodiment is that a manual focus adjustment knob such as a focus ring is used as an external command means in place of the ∞ and shortest range direction drive switches 121 and 122.

In FIG. 6, this lens control apparatus has a focus ring 301 fitted on a lens barrel. The focus ring 301 comprises a knob 302 with which a photographer rotates the focus ring 301, an encoder section 303 of the focus ring 301, which section is rotated upon rotation of the knob 302 so as to convert the rotational amount of the focus ring 301 into an electrical signal, a light-emitting element 304 for emitting light toward the encoder section 303, and a phototransistor 305 for receiving light emitted from the light-emitting element 304 and reflected by a tooth portion of the comb structure of the encoder section 303, and converting the received light into an electrical signal.

When the focus ring 301 with the structure shown in FIG. 6, and the light-emitting/receiving elements 304 and 305 are selected to have the positional relationship shown in FIG. 7 (when one of the light-emitting/receiving elements 304 and 305 is represented by A, and the other is represented by B, a relative mounting phase difference between A and B with respect to the period of the teeth is selected to be an odd-number multiple of 90°), the phase of the output signal from B changes, as shown in FIG. 8, with respect to the output signal from A. More specifically, if B goes to high level when A is "1", counterclockwise rotation can be detected; if B goes to low level, clockwise rotation can be detected.

In the control system including the above-mentioned focus ring, a microcomputer 116 performs the processing shown in FIG. 9.

In FIG. 9, when execution of this processing is started, it is checked in step 901 if the output from a sensor (light-emitting/receiving element) A changes, i.e., if the output value changes from 0 to 1 or vice versa. Although this checking method is not described in detail, for example, in consideration of the fact that the rotational speed of the focus ring is not constant, the time may be counted from when the first change in output from the sensor A is detected, and only when the output value from the sensor A is left unchanged for a predetermined period of time, the control may branch to "NO" in step 901.

If it is determined in step 901 that the change in output from the sensor A is detected, the flow advances to step 902. In step 902, it is determined that the focus ring is rotated, and even if the camera is in the automatic focus adjustment mode, the focus adjustment mode is forcibly changed to the manual focus adjustment mode. In step 903, it is checked if the output value from the sensor A is 1. If NO in step 903, the flow returns to the processing in step 901. However, if YES in step 903, it is checked in step 904 or 905 if the output value from the sensor B goes to high level or low level. If the output value from the sensor B goes to high level, it is determined that the focus ring is rotated counterclockwise, and a focus compensation lens group is moved in the direction of shortest range in step 906; if the output value from the sensor B goes to low level, it is determined that the focus ring is rotated clockwise, and the focus compensation lens group is moved in the direction of ∞ in step 907.

If it is determined that the output from the sensor B goes to neither high level nor low level, it is determined that the focus ring is stopped, and it is checked in step 908 if the original focus adjustment mode is the automatic or manual mode. If it is determined that the original focus adjustment mode is the automatic mode, automatic focus adjustment is performed in step 909; otherwise, the control stops in step 910 until the next rotation of the focus ring is detected.

With the above-mentioned processing, even in a camera having no switches to be turned on/off such as the shortest range/∞ drive switches 121 and 122 in the first embodiment, e.g., a camera having a manual focus adjustment knob such as a focus ring, the manual focus adjustment mode can be automatically selected upon detection of the rotation or movement of the knob, and the control can be automatically returned to the automatic focus adjustment mode.

As described above, according to the present invention, since the apparatus comprises the manual command reception means for always receiving a manual focus command, and the manual focus adjustment selection means for, when the manual command receiving means receives the manual command, selecting the manual focus adjustment means to execute the drive control of the focus adjustment lens group, a photographer can readily perform manual focus adjustment even in the automatic focus adjustment mode regardless of whether the automatic or manual focus adjustment mode is currently selected. Thus, operability can be remarkably improved.

According to the present invention, since the apparatus further comprises the mode return means for, when no manual focus command is issued by an external operation, performing the drive control of the lens group according to the selection result of the mode selection means, the control can be immediately returned to a focus adjustment mode before operation when the operation of the external command means is stopped. Thus, even when a photographer forgets that the manual focus adjustment mode is selected, and starts a photographing operation, he or she can be prevented from erroneously photographing an out-of-focus image.

What is claimed is:

1. A lens control apparatus comprising:
   a) lens drive means for driving a focus lens;
   b) automatic focus adjustment means for controlling said lens drive means in an automatic focus adjustment mode;
   c) manual focus adjustment means for controlling said lens drive means in a manual focus adjustment mode;
   d) mode selecting means for selectively setting said automatic focus adjustment mode and said manual focus adjustment mode; and
   e) control means for, when a manual operation is performed, preferentially enabling said manual focus adjustment means to set the manual focus adjustment mode regardless of the state of said mode selecting means.

2. An apparatus according to claim 1, wherein said automatic focus adjustment mode extracts a high-frequency component in a video signal, and controls said lens drive means according to a level of the high-frequency component to drive said focus lens to an in-focus point.

3. An apparatus according to claim 1, wherein said manual focus adjustment means includes an ∞ direction operation switch for driving said focus lens in a direction of ∞, and a near direction switch for driving said focus lens in a direction of shortest range, and controls said lens drive means to drive said focus lens in a direction corresponding to one of these switches, which is operated.

4. An apparatus according to claim 3, wherein said ∞ direction operation switch and said near direction switch comprise a pair of switches.

5. An apparatus according to claim 3, wherein said ∞ direction operation switch and said near direction switch are constituted by a focus ring, and a sensor for detecting a rotational state of said focus ring.

6. An apparatus according to claim 1, wherein when the manual operation is performed while said automatic focus adjustment means is enabled, said control means interrupts the automatic focus adjustment mode, and sets the manual focus adjustment mode.

7. An apparatus according to claim 1, further comprising a zoom lens, and wherein said focus lens has a compensator function of compensating for a change in position of a focal plane upon driving of said zoom lens.

8. A lens control apparatus comprising:
   a) lens drive means for driving a focus lens;
   b) automatic focus adjustment means for controlling said lens drive means in an automatic focus adjustment mode;
   c) manual focus adjustment means for controlling said lens drive means in a manual focus adjustment mode;
   d) selection means for selectively switching between the automatic and manual focus adjustment modes; and e) control means for, when a manual operation is performed, preferentially enabling said manual focus adjustment means to set the manual focus adjustment mode, and resuming the mode regardless of the state of said selection means selected by said selection means upon completion of the manual operation.

9. An apparatus according to claim 8, wherein said manual focus adjustment means includes an ∞ direction operation switch for driving said focus lens in a direction of ∞, and a near direction switch for driving said focus lens in a direction of shortest range, and controls said lens drive means to drive said focus lens in a direction corresponding to of one of these switches, which is operated.

10. An apparatus according to claim 9, wherein said ∞ direction operation switch and said near direction switch comprise a pair of switches.

11. An apparatus according to claim 9, wherein said ∞ direction operation switch and said near direction switch are constituted by a focus ring, and a sensor for detecting a rotational state of said focus ring.

12. An apparatus according to claim 8, wherein said lens drive means has a focus adjustment function with respect to an object, and a compensator function of compensating for a change in position of a focal plane upon movement of a zoom lens, and the compensator function can be enabled regardless of whether the automatic or manual focus adjustment modes is currently selected.

13. A photographing apparatus comprising:
a) photographing means capable of setting a plurality of photographing modes;
b) selection means for selecting one of the plurality of photographing modes;
c) operation means for setting a specific one of the plurality of photographing modes; and
d) control means for, when said operation means is not operated, enabling the photographing mode selected by said selection means, and for, when said operation means is operated, enabling the specific photographing mode regardless of the state of said selection means and successively resuming the photographing mode which had been selected by said selection means prior to the operation of said operation means.

14. An apparatus according to claim 13, wherein the photographing modes are focus adjustment modes.

15. An apparatus according to claim 13, wherein the plurality of photographing modes include an automatic control mode for automatically controlling a photographing state, and a manual control mode for manually controlling the photographing state.

16. An apparatus according to claim 15, wherein said operation means sets the manual control mode.

* * * * *